United States Patent [19]

Yamada et al.

[11] Patent Number: 5,580,145
[45] Date of Patent: Dec. 3, 1996

[54] REAR PROJECTION TYPE TELEVISION RECEIVER

[75] Inventors: Tadayoshi Yamada, Osaka; Kazumi Gotou; Masahiro Tozuka, both of Takatsuki; Tsuyoshi Shimatani, Kyoto; Yoshinobu Maeda, Katano, all of Japan

[73] Assignee: Matsushita Electric Industrial Co., Ltd., Osaka, Japan

[21] Appl. No.: 493,361

[22] Filed: Jun. 21, 1995

[30] Foreign Application Priority Data

Jun. 21, 1994 [JP] Japan .................................. 6-138698

[51] Int. Cl.$^6$ ................................................... G03B 21/00
[52] U.S. Cl. .............................. 353/74; 359/460; 348/836
[58] Field of Search ........................ 353/94, 74; 359/443, 359/436, 457, 460; 348/836, 839, 840

[56] References Cited

U.S. PATENT DOCUMENTS

| | | | |
|---|---|---|---|
| 4,921,330 | 5/1990 | Takahashi et al. | |
| 5,206,760 | 4/1993 | Nakashima et al. | 359/457 |
| 5,363,149 | 11/1994 | Furuno et al. | 359/457 |
| 5,382,990 | 1/1995 | Hata et al. | 359/460 |
| 5,402,263 | 3/1995 | Kita et al. | 359/457 |

FOREIGN PATENT DOCUMENTS

| | | | |
|---|---|---|---|
| 523427 | 1/1993 | European Pat. Off. | |
| 0567317 | 10/1993 | European Pat. Off. | 359/457 |
| 623839 | 11/1994 | European Pat. Off. | |
| 650295 | 4/1995 | European Pat. Off. | |
| 9005951.4 | 11/1990 | Germany . | |
| 5-72629 | 3/1993 | Japan . | |
| 5-66481 | 3/1993 | Japan . | |
| 6059339 | 3/1994 | Japan . | |

OTHER PUBLICATIONS

European Search Report dated Oct. 27, 1995 (For Application #EP 95304227).

*Primary Examiner*—William Dowling
*Attorney, Agent, or Firm*—Ratner & Prestia

[57] ABSTRACT

A rear projection type television receiver of the invention comprises a cabinet having a built-in television receiver, and a screen assembly. The cabinet has a rectangular groove formed around the circumference of the front edge portion. The screen assembly has screen holding plates elastically coupled to each side of the screen, and screen frames coupled to screen holding plates. The screen frames are coupled in a rectangular form. The screen assembly is coupled with the cabinet when the screen frames are inserted into the front groove of the cabinet.

9 Claims, 4 Drawing Sheets

REAR PROJECTION TYPE TELEVISION RECEIVER

FIELD OF THE INVENTION

The present invention relates to a rear projection type television receiver for displaying an image projected on a rear side of a transmission type screen (hereinafter called screen). The rear projection type television receiver can be used either alone or in a large-screen display composed of multiple units.

BACKGROUND OF THE INVENTION

FIG. 7 shows the screen holding assembly of a conventional rear projection type television receiver. On the rear side of a screen 3, an image 66 is projected from a television receiver (not shown) incorporated in a cabinet 63. The screen 3 inserted in a lower groove 64 of the cabinet is held in the cabinet 63 by a screen holding frame 62 inserted in an upper groove 65 of the cabinet. Temperature rise during use and increase of ambient humidity will expand the screen 3. A gap 61 absorbs the expansion of the screen 3. If, for example, the screen 3 has a length of 900 mm, the length will be increased by about 3.5 mm based on expected increase of temperature and humidity. Therefore a length of 3.5 mm is required for the gap 61. As a result, as shown in FIG. 7, a width W of about 5 mm is required for the rim of the screen. FIG. 8 shows a wide-screen display composed of nine rear projection type television receivers. Plural dark screen rims R of about 10 mm in width cross the screen surface and lower the screen quality. It is hence an object of the invention to present a rear projection type television receiver with a decrease rim width around the screen in order to realize a wide screen of high picture quality.

SUMMARY OF THE INVENTION

The rear projection type television receiver of the invention is constructed by coupling a cabinet and a screen assembly. In the screen assembly, the screen is held by a screen holding plate elastically coupled to each side of the screen. This elastic coupling absorbs the screen expansion. Therefore, the screen assembly does not require a gap for absorbing the screen expansion. As a result, the width of the rim around the screen is decreased, so that a wide screen of high quality is realized.

EXEMPLARY EMBODIMENT

Figure 1:
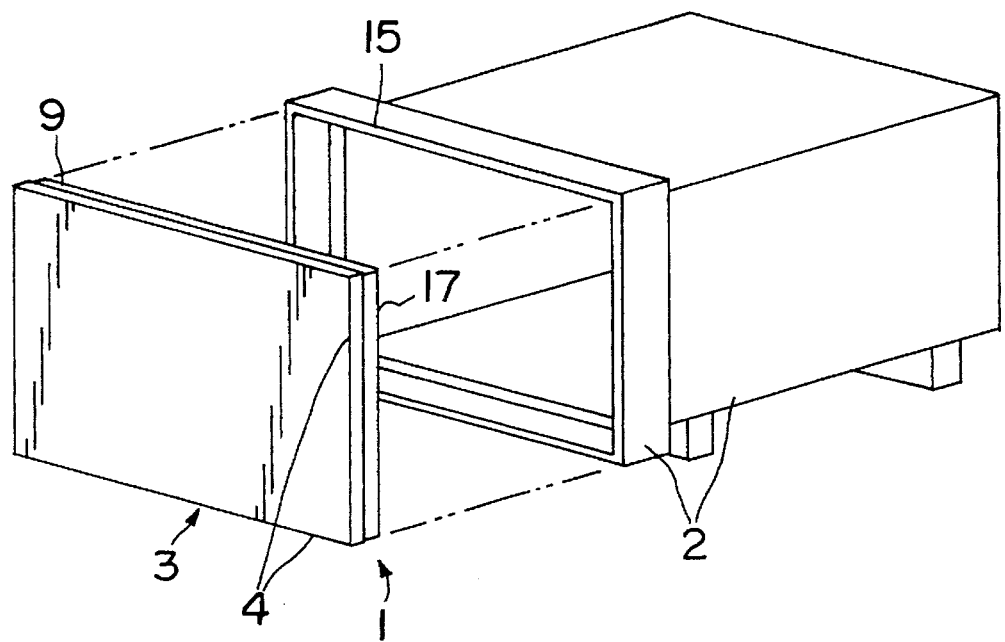
FIG. 1 is a perspective view of a rear projection type television receiver of the invention.

The rear projection type television receiver of the invention comprises, as shown in FIG. 1, a cabinet 2 incorporating a television receiver, and a screen assembly 1. The screen assembly 1 is fitted to the cabinet 2 by inserting a screen frame 9 into a rectangular groove 15 formed around on the front face of the cabinet, and is fixed to the cabinet 2 by fasteners 4 (described herein). There are four fasteners 4 in FIG. 1. The screen assembly 1 can be detached from the cabinet 2 by unlocking the fasteners 4.

Figure 2:
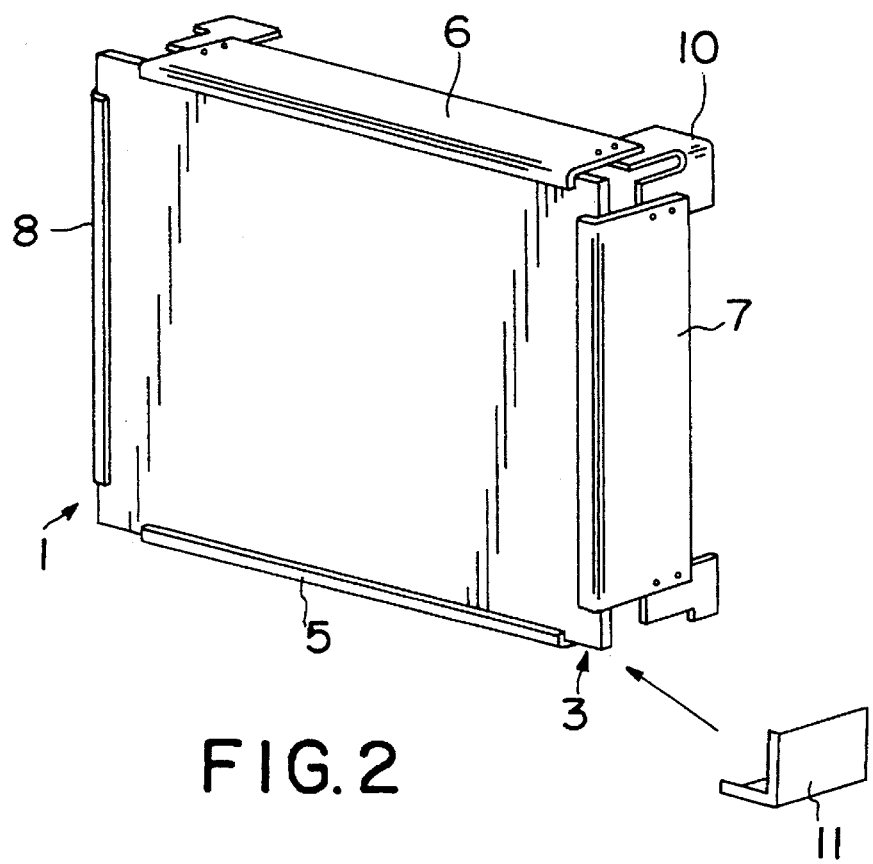
FIG. 2 is a perspective view showing the structure of a screen assembly.
Figure 3:
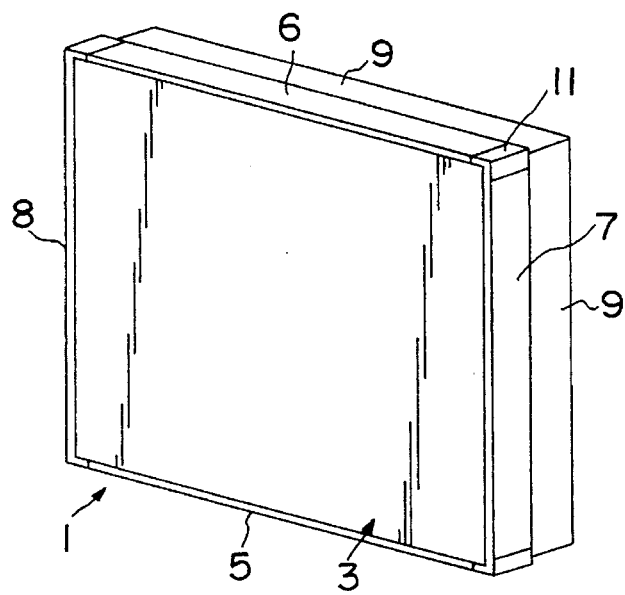
FIG. 3 shows the shape of the screen assembly.

FIG. 2 and FIG. 3 show the construction of the screen assembly 1. As shown in FIG. 2, screen holding plates 5, 6, 7, 8 are elastically adhered to each side of the screen 3, and coupled by coupling means 10. Corner plates 11 cover the four corners so that projected light may not escape outside. The screen frame 9 is fitted, in a rectangular form, to the screen holding plates 5 through 8 and coupling means 10. FIG. 3 shows the completed shape of the screen assembly 1.

Figure 4:
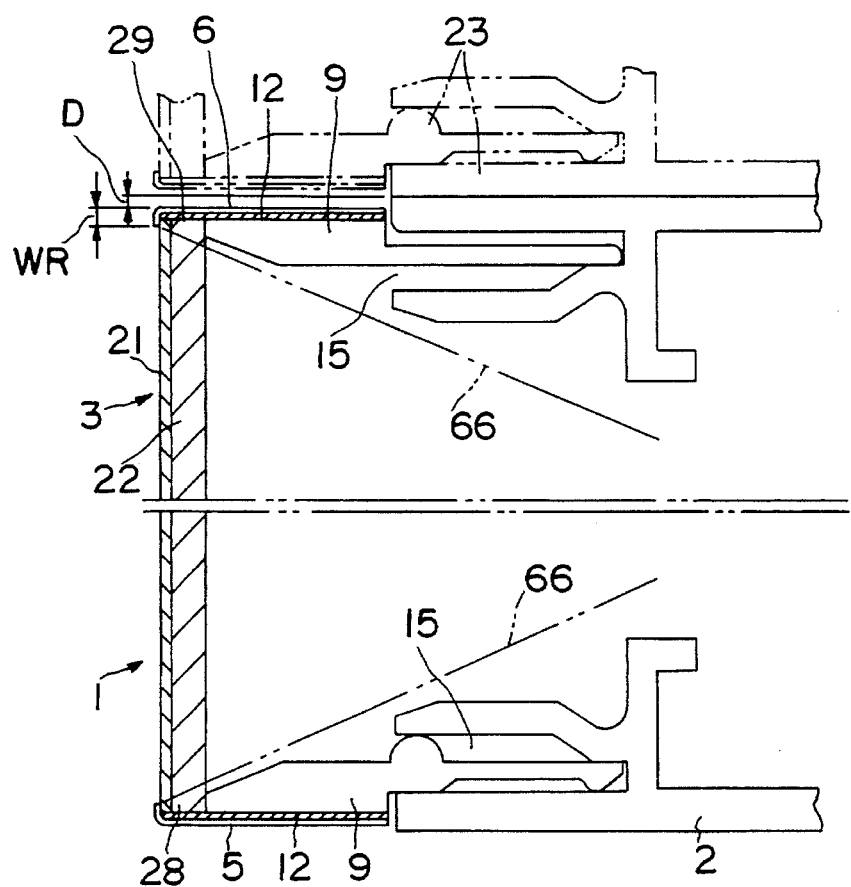
FIG. 4 is a fragmentary partial sectional view of the screen holding assembly of the rear projection type television receiver of the invention.

FIG. 4 shows a section of the rear projection type television receiver of the invention. The screen assembly 1 is fitted to the cabinet 2 by inserting the front end of the screen frame 9 into the front groove 15 of the cabinet. The screen assembly 1 is smaller than the cabinet 2, by the distance D being 0.5 mm as shown in FIG. 4, so as not to interfere with another screen assembly when the rear projection type television receivers are stacked.

The screen holding plates 5 to 8 (7, 8 are not shown) have a folded rim having a short width WR of 0.8 mm. The difference in expansion of the screen holding plates and screen 3 is absorbed by the elasticity of an adhesive sheet 12, and thus holding the screen is possible with a rim of short width. The screen assembly 1 will not be destroyed by the difference in expansion.

Through the adhesive sheet 12, the bottom of the screen 3 and the screen frame 9 are adhered to the screen holding plate 5, the upper side of the screen 3 and the screen frame 9 are adhered to the screen holding plate 6, and, although not shown, the right side of the screen 3 and the screen frame 9 are adhered to the screen holding plate 7, and the left side of the screen 3 and the screen frame 9 are adhered to the screen holding plate 8. That is, the screen 3 is held between the screen rim and the screen frame 9 adhered to the screen holding plate 7.

When multiple rear projection type television receivers are stacked up in a rectangular form to make a wide screen, it is preferred that each screen rim be aligned vertically and horizontally. To realize this, the bottom of the screen 3 is tightly fitted and fixed to the cabinet 2 so as to maintain a precise relative position, in the vertical and horizontal direction, to the cabinet 2. The upper side, left side and right side of the screen 3 are loosely fitted so as to be free to move along with expansion of the screen 3. In FIG. 4, the upper side screen frame 9 and right and left screen frames 9 (not shown) differ in shape from the lower side screen frame 9.

The screen 3 is composed of lamination of lenticular lens sheet 21 and Fresnel lens sheet 22 both made of acrylic resin. In most cases, the thickness of the lenticular lens sheet 21 is 0.5 to 1.5 mm, and the thickness of the Presnel lens sheet 22 is 2 to 3 mm. Temperature rise and increase of ambient humidity cause both lens sheets to expand, but the lenticular lens sheet 21 expands more than the Fresnel lens sheet 22. Therefore, if the sides of both lens sheets are adhered to the screen holding plates 5 to 8, the screen 3 will be distorted, or broken in a worst case, due to changes in temperature and humidity. Screen distortion must be avoided because this causes the image to be distorted. To avoid the distortion, in the invention, the Fresnel lens sheet 22 is adhered to the screen holding plate only on the bottom side, while all four sides of the lenticular lens sheet 21 are adhered to the screen holding plates. The sides other than the bottom side of the Fresnel lens sheet 22 are not adhered to the screen holding plates. This can be accomplished by setting the size of the Fresnel lens sheet 22 slightly smaller than the size of the lenticular lens sheet 21.

Figure 5:
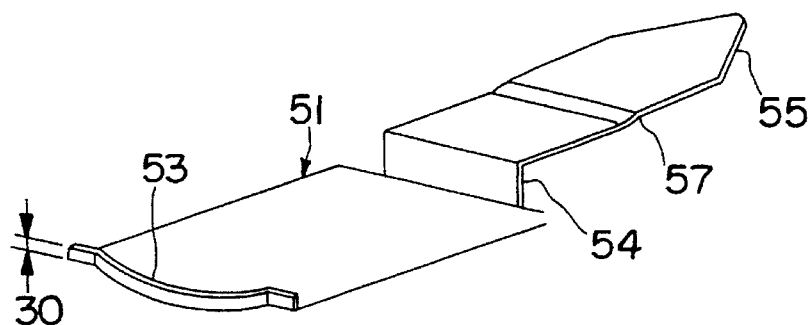
FIG. 5 shows a lock wedge used in attaching the screen assembly to a cabinet.
Figure 6A:
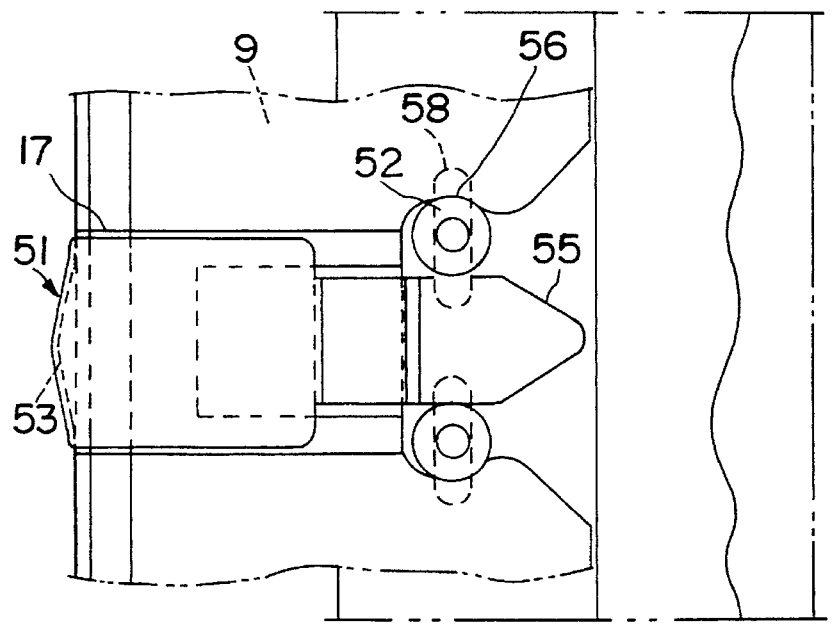
FIGS. 6(a) and 6(b) are a fragmentary plan view and a fragmentary elevational view partially in section showing the screen assembly attached to the cabinet.
Figure 6B:
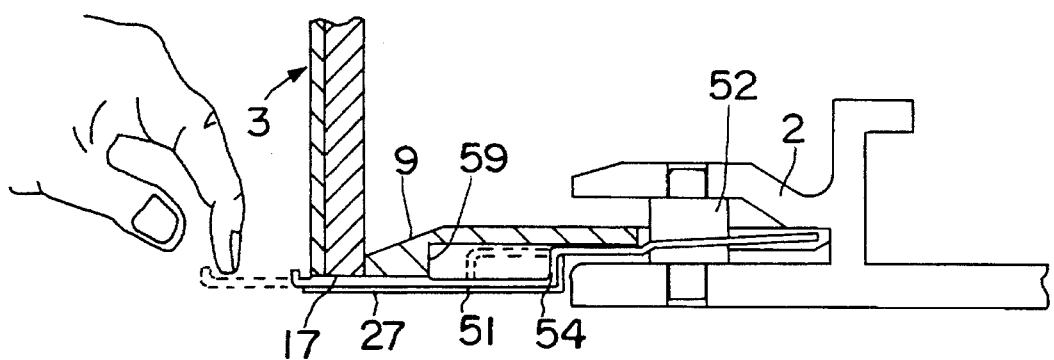
Figure 7:
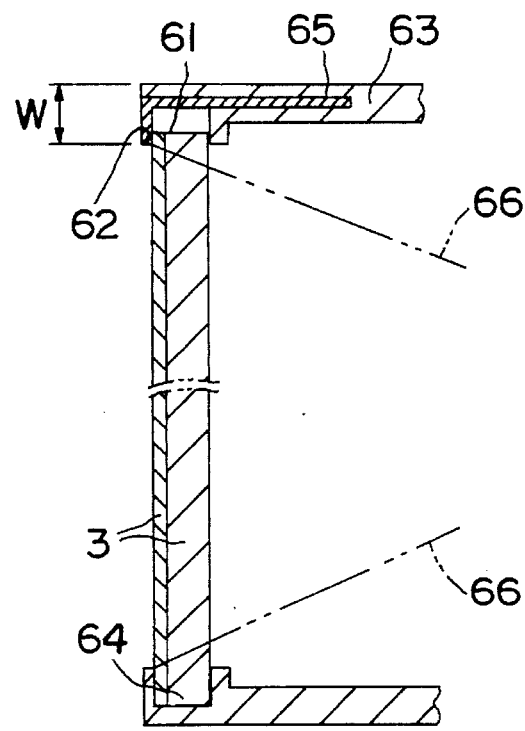
FIG. 7 shows the screen holding assembly of a conventional rear projection type television receiver.
Figure 8:
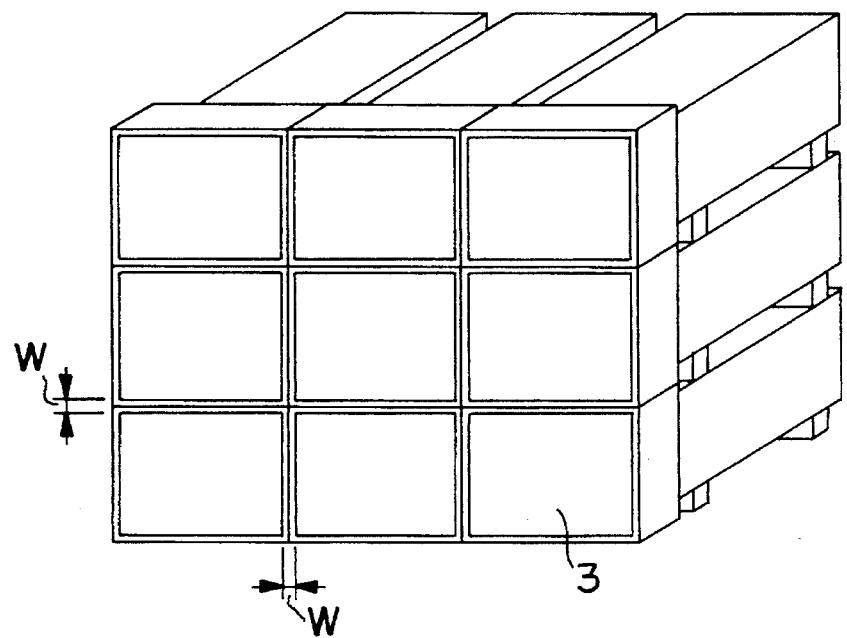
FIG. 8 shows multiple rear projection type television receivers stacked up for making a wide screen.

Next, the fastening of the screen assembly to the cabinet is explained,. FIG. 5 shows a lock wedge 51. The screen assembly is attached to the cabinet by pushing in the lock wedge 51. To the contrary, the screen assembly is separated from the cabinet by pulling out the lock wedge 51. The lock wedge 51 fits into a groove 17 of the screen frame 9, and is moveably positioned in the screen assembly 1. When the screen assembly 1 is fitted in the cabinet 2, the lock wedge 51. will be at the position indicated by broken line in FIG. 6(b). Attaching the screen 3 into the cabinet 2 is effected by pushing the lock wedge 51 into the cabinet 2 as shown in FIGS. 6(a) and 6(b). As shown in FIG. 6(a), the tapered end of the lock wedge 51 is pushed in and, when the lock position is reached, expands two lock pins 52 movable along a groove 58 of the cabinet 2. Each lock pin 52 holds the dent 56 so as to lock the screen frame 9 in position. As a result, the screen 3 is fixed to the cabinet 2.

To separate the screen assembly 1 from the cabinet 2, the lock wedge 51 is pulled out. As shown in FIG. 5, the lock wedge 51 has a bulge 53 adapted for insertion of a finger or a tool to pull out the lock wedge 51 as shown in FIG. 6(b), a shoulder 54, and a slope 57 for hooking on a pawl to be used when removing the screen assembly 1. The slope 57 provides the lock wedge 51 with an elasticity for preventing the lock wedge 51 from slipping out of the lock position. As shown in FIG. 6(b), when the lock wedge 51 is pulled out, the shoulder 54 interferes with the end portion 59 of the screen frame 9. As a result, the screen assembly 1 is separated from the cabinet 2, together with the lock wedge 51, by pulling-out the lock wedge 51.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A rear projection type television receiver comprising:
   a cabinet having a built-in television receiver, said cabinet having a rectangular front groove along the edge portion of a front face of the cabinet,
   a screen assembly comprising:
   a screen,
   screen holding plates elastically coupled with each side of the screen,
   a screen frame coupled to each of the screen holding plates said screen frame forming a rectangle, and,
   at least one fastening means for fastening the screen assembly to the cabinet,
   wherein said screen assembly is attached to the cabinet by inserting the screen frames into the front groove of the cabinet, and using said fastening means to secure said screen assembly to said cabinet.

2. A rear projection type television receiver of claim 1, wherein at least one side of the screen frame inserted in the front groove of the cabinet is permanently positioned, and the other sides are moveably positioned.

3. A rear projection type television receiver of claim 1, wherein
   each of said screen holding plates has a rim, said screen holding plates are coupled to each other to form a rectangle, and
   wherein each side of the screen is held between the rim of the screen holding plate and a front edge of the screen frames, and the rim of the screen holding plates overlapping a front edge of the screen.

4. A rear projection type television receiver of claim 1, wherein the screen is composed of a lamination of a lenticular lens sheet and a Fresnel lens sheet, and the length of each side of the lenticular lens sheet is longer than the length of each corresponding side of the Fresnel lens sheet.

5. A rear projection type television receiver of claim 4, wherein each side of the lenticular lens sheet is coupled to the screen holding plate, and only one side of the Fresnel lens sheet is coupled to the screen holding plate.

6. A rear projection type television receiver of claim 1, wherein the fastening means for fastening the screen assembly to the cabinet comprises:
   a lock wedge positioned at the edge portion of the screen and movable in a direction perpendicular to the screen,
   a lock pin coupled to the cabinet, movable in the direction parallel to the screen, and not movable in the direction perpendicular to the screen, and
   an indent formed in the screen frame,
   wherein when the lock wedge is pushed towards the screen, a tip of the lock wedge pushes the lock pin in the movable direction so that the lock pin is positioned in the indent of the screen frame, thereby attaching the screen assembly to the cabinet.

7. A rear projection type television receiver of claim 6, wherein a base portion of the lock wedge has a rim portion which contacts a front face of the screen when the lock wedge is pushed towards the screen.

8. A rear projection type television receiver of claim 7, wherein the rim portion at the base portion of the lock wedge has a bulge for accepting a finger or a tool for pulling the lock wedge away from the screen.

9. A rear projection type television receiver of claim 6, wherein the lock wedge has a shoulder portion in the middle of the lock wedge, and when the lock wedge is pulled away from the screen, the shoulder portion of the lock wedge contacts the screen assembly, and the screen assembly is separated from the cabinet.

\* \* \* \* \*